(12) United States Patent
Martini et al.

(10) Patent No.: US 8,066,615 B2
(45) Date of Patent: Nov. 29, 2011

(54) METHOD AND APPARATUS TO DETECT A MODE-GEAR MISMATCH DURING OPERATION OF AN ELECTRO-MECHANICAL TRANSMISSION

(75) Inventors: Ryan D. Martini, Royal Oak, MI (US); Charles J. Van Horn, Novi, MI (US); Peter E. Wu, Brighton, MI (US); Andrew M. Zettel, Ann Arbor, MI (US); Sam Almasri, Novi, MI (US); Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 745 days.

(21) Appl. No.: 11/854,563

(22) Filed: Sep. 13, 2007

(65) Prior Publication Data

US 2009/0075773 A1    Mar. 19, 2009

(51) Int. Cl.
*B60K 1/02* (2006.01)
*B60W 10/04* (2006.01)

(52) U.S. Cl. ........ 477/3; 477/110; 477/904; 180/65.285
(58) Field of Classification Search ............. 477/3, 904, 477/110; 180/65.265, 65.275, 65.285
See application file for complete search history.

(56) References Cited

U.S. PATENT DOCUMENTS

| | | | |
|---|---|---|---|
| 6,953,409 B2 | 10/2005 | Schmidt et al. | |
| 6,976,388 B2 * | 12/2005 | Heap et al. | 73/115.02 |
| 7,217,221 B2 * | 5/2007 | Sah et al. | 477/3 |
| 7,670,252 B2 * | 3/2010 | Wu et al. | 477/3 |
| 7,693,637 B2 * | 4/2010 | Mensler et al. | 701/55 |
| 2004/0256165 A1 * | 12/2004 | Tomita et al. | 180/65.2 |
| 2007/0099739 A1 | 5/2007 | Foster et al. | |
| 2007/0111854 A1 * | 5/2007 | Tabata et al. | 477/110 |
| 2007/0149348 A1 * | 6/2007 | Holmes et al. | 477/3 |
| 2008/0004156 A1 * | 1/2008 | Tabata et al. | 477/3 |

* cited by examiner

*Primary Examiner* — Roger Pang (57) ABSTRACT

A method for operating the powertrain includes monitoring operator inputs, monitoring a transmission output, and terminating an engine operating mode when a time-rate change in the transmission output exceeds a threshold absent a change in the monitored operator inputs.

8 Claims, 5 Drawing Sheets

METHOD AND APPARATUS TO DETECT A MODE-GEAR MISMATCH DURING OPERATION OF AN ELECTRO-MECHANICAL TRANSMISSION

TECHNICAL FIELD

This invention pertains generally to control systems for electro-mechanical transmissions.

BACKGROUND OF THE INVENTION

The statements in this section merely provide background information related to the present disclosure and may not constitute prior art.

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline and to wheels of the vehicle. Electric machines, operatively connected to an electrical energy storage device, comprise motor/generators operable to generate motive torque for input to the transmission, independently of torque input from the internal combustion engine. The electric machines are further operable to transform vehicle kinetic energy, transmitted through the vehicle driveline, to electrical energy that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electric machines.

The exemplary electro-mechanical transmissions are selectively operative in fixed gear modes and continuously variable modes through actuation of the torque-transfer clutches, typically employing a hydraulic circuit to effect clutch actuation. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electric machines. The electric machines can be connected to the output shaft via actuation of a clutch, or by direct connection. Clutch actuation and deactivation is typically effected through a hydraulic circuit.

The electric machines can be connected to the output shaft via actuation of a clutch, or by direct connection. Clutch actuation and deactivation is typically effected through a hydraulic circuit, including electrically-actuated hydraulic flow management valves, pressure control solenoids, and pressure monitoring devices controlled by a control module.

During operation, there is a need to monitor operation to identify a mismatch between a commanded operating range state and an actual operating range state. In such a situation, a mode-gear mismatch may occur, comprising the control system commanding operation in a continuously variable mode, when the transmission is actually operating at a fixed gear ratio. When this occurs, the control system tries to force engine speed to a calculated optimum speed based upon the continuously variable operating mode. There is a need to effectively identify absence of a mismatch, identify presence of a mismatch, and mitigate effects of any mismatch.

SUMMARY OF THE INVENTION

A vehicular powertrain includes an electro-mechanical transmission mechanically-operatively coupled to an internal combustion engine. A method for operating the powertrain includes monitoring operator inputs, monitoring a transmission output, and terminating an engine operating mode when a time-rate change in the transmission output exceeds a threshold absent a change in the monitored operator inputs.

DETAILED DESCRIPTION OF A PREFERRED EMBODIMENT

Figure 1:
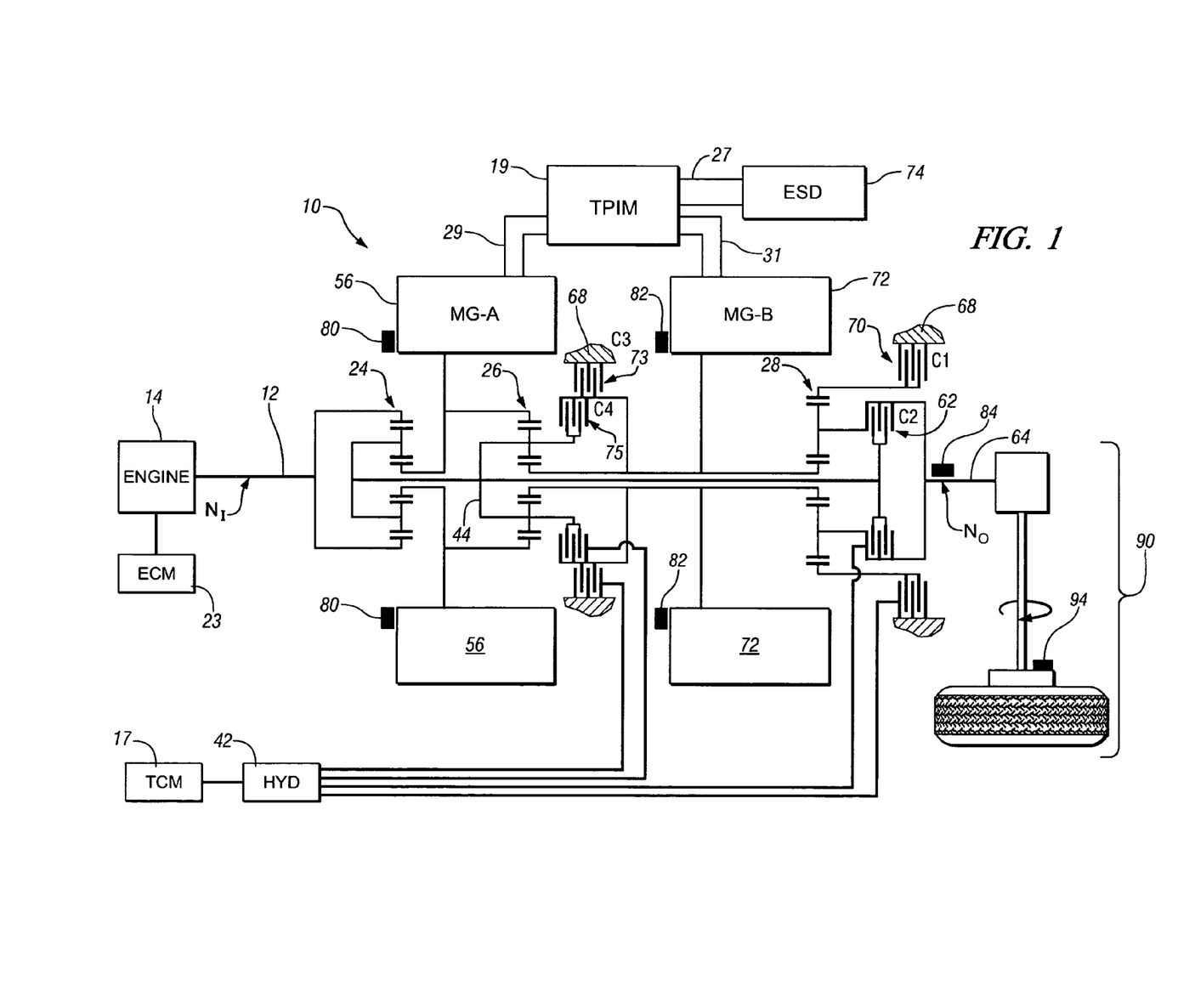
FIG. 1 is a schematic diagram of an exemplary powertrain, in accordance with an embodiment of the present invention.
Figure 2:
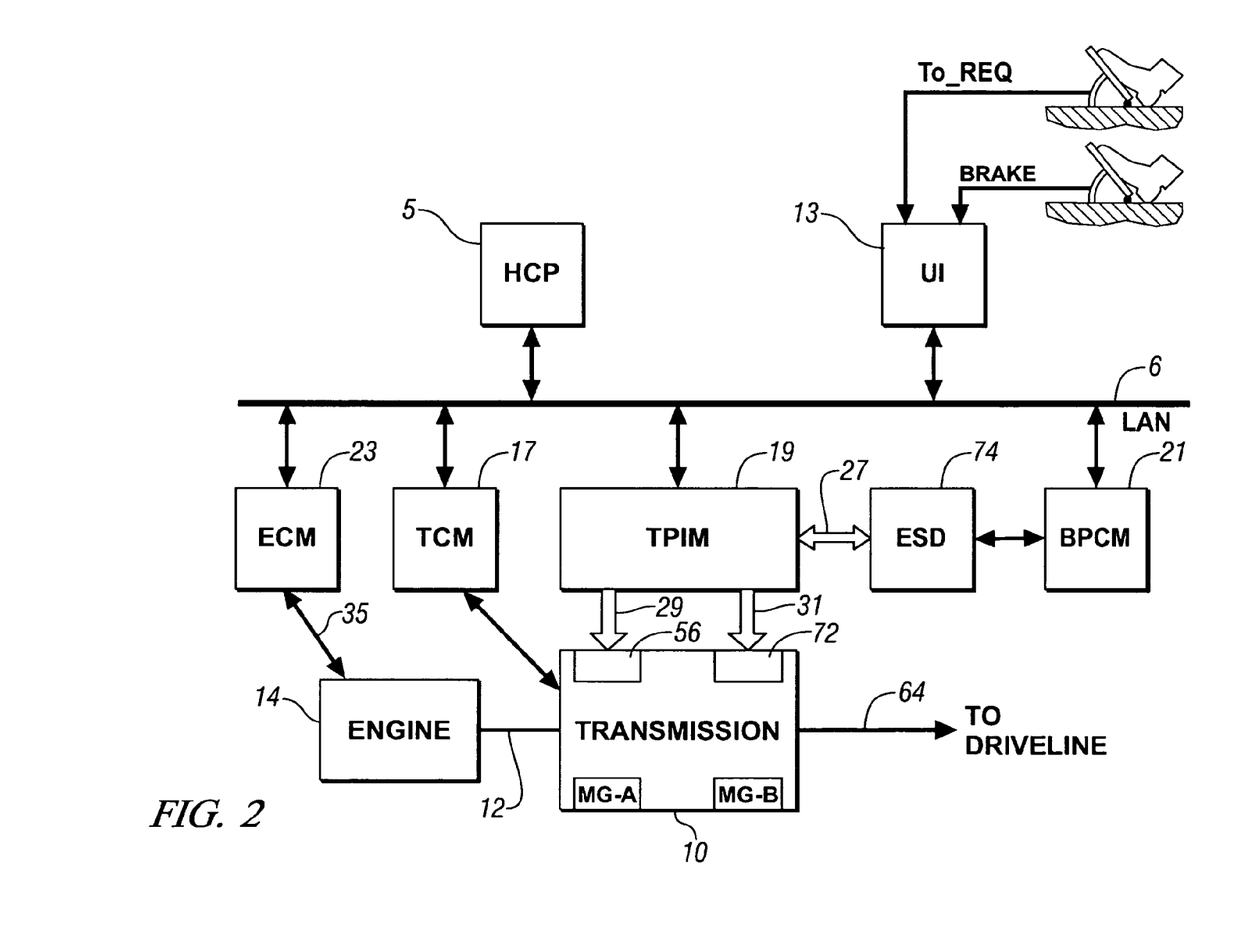
FIG. 2 is a schematic diagram of an exemplary architecture for a control system and powertrain, in accordance with an embodiment of the present invention.

Referring now to the drawings, wherein the depictions are for the purpose of illustrating embodiments of the invention only and not for the purpose of limiting the same, FIGS. 1 and 2 depict a system comprising an engine 14, transmission 10, driveline 90, control system, and hydraulic control circuit 42 (FIG. 4) which has been constructed in accordance with an embodiment of the present invention. The exemplary hybrid powertrain system is configured to execute the control scheme depicted hereinbelow with reference to FIG. 5. Mechanical aspects of the exemplary transmission 10 are disclosed in detail in commonly assigned U.S. Pat. No. 6,953,409, which is incorporated herein by reference. The exemplary two-mode, compound-split, electro-mechanical hybrid transmission embodying the concepts of the present invention is depicted in FIG. 1. The transmission 10 includes an input shaft 12 having an input speed, $N_I$ that is preferably driven by the internal combustion engine 14, and an output shaft 64 having an output rotational speed, $N_O$.

The exemplary engine 14 comprises a multi-cylinder internal combustion engine selectively operative in several states to transmit torque to the transmission via shaft 12, and can be either a spark-ignition or a compression-ignition engine. The engine 14 has a crankshaft having characteristic speed $N_E$ which is operatively connected to the transmission input shaft 12. The output of the engine, comprising speed $N_E$ and output torque $T_E$ can differ from transmission input speed $N_I$ and engine input torque $T_I$ when a torque management device (not shown) is placed therebetween.

The transmission 10 utilizes three planetary-gear sets 24, 26 and 28, and four torque-transmitting devices, i.e., clutches C1 70, C2 62, C3 73, and C4 75. An electro-hydraulic control system 42, preferably controlled by transmission control module (TCM) 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68. Each clutch is preferably hydraulically actuated, receiving pressurized hydraulic fluid from a pump 88 via an electro-hydraulic control circuit 42.

There is a first electric machine comprising a motor/generator 56, referred to as MG-A, and a second electric machine comprising a motor/generator 72, referred to as MG-B operatively connected to the transmission via the planetary gears. Each of the machines includes a stator, a rotor, and a resolver assembly 80, 82. The stator for each machine is grounded to outer transmission case 68, and includes a stator core with coiled electrical windings extending therefrom. The rotor for MG-A 56 is supported on a hub plate gear that is operably attached to output shaft 60 via carrier 26. The rotor for MG-B 72 is attached to sleeve shaft hub 66. The resolver assemblies 80, 82 are appropriately positioned and assembled on MG-A 56 and MG-B 72. Each resolver assembly 80, 82 comprises a known variable reluctance device including a resolver stator, operably connected to the stator of each electric machine, and a resolver rotor, operably connected to the rotor of each electric machine. Each resolver 80, 82 comprises a sensing device adapted to sense rotational position of the resolver stator relative to the resolver rotor, and identify the rotational position. Signals output from the resolvers are interpreted to provide rotational speeds for MG-A 56 and MG-B 72, referred to as $N_A$ and $N_B$. Transmission output shaft 64 is operably connected to a vehicle driveline 90 to provide motive output torque, $T_O$, to vehicle wheels. There is a transmission output speed sensor 84, operative to monitor rotational speed of the output shaft 64. Each of the vehicle wheels is equipped with a sensor 94 adapted to monitor wheel speed, the output of which is monitored by the control system and used to determine absolute wheel speed and relative wheel speed for braking control, traction control, and vehicle acceleration management.

The transmission 10 receives input torque from the torque-generative devices, including the engine 14, and MG-A 56 and MG-B 72, referred to as '$T_I$', '$T_A$', and '$T_B$' respectively, as a result of energy conversion from fuel or electrical potential stored in an electrical energy storage device (ESD) 74. The ESD 74 is high voltage DC-coupled to transmission power inverter module (TPIM) 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A 56 and MG-B 72. The distributed control module architecture includes engine control module (ECM) 23, transmission control module (TCM) 17, battery pack control module (BPCM) 21, and TPIM 19. A hybrid control module (HCP) 5 provides overarching control and coordination of the aforementioned control modules. There is a User Interface (UI) 13 operably connected to a plurality of devices through which a vehicle operator typically controls or directs operation of the powertrain including the transmission 10, including an operator torque request (To_req) and operator brake request (BRAKE). Exemplary vehicle input devices to the UI 13 include an accelerator pedal, a brake pedal, a transmission gear selector, and a vehicle speed cruise control. Each of the aforementioned control modules communicates with other control modules, sensors, and actuators via a local area network (LAN) bus 6. The LAN bus 6 allows for structured communication of control parameters and commands among the various control modules. The specific communication protocol utilized is application-specific. The LAN bus and appropriate protocols provide for robust messaging and multi-control module interfacing between the aforementioned control modules, and other control modules providing functionality such as antilock braking, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: the operator torque request (To_req), the engine input torque $T_I$, clutch torque, $(T_{CL\_N})$ for the N various torque-transfer clutches C1, C2, C3, C4 of the transmission 10; and motor torques $T_A$ and $T_B$ for MG-A 56 and MG-B 72. The TCM 17 is operatively connected to the electro-hydraulic control circuit 42, including for monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine input torque command from the HCP 5, and generates a desired axle torque, and an indication of actual engine input torque, $T_I$, to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_E$, to shaft 12 (which translate to transmission input speed, $N_I$) manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques $(T_{CL\_N})$ for each of the N clutches, i.e., C1, C2, C3, and C4, and rotational output speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, amp-hour throughput, battery temperature, battery voltage and available battery power.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Figure 3:
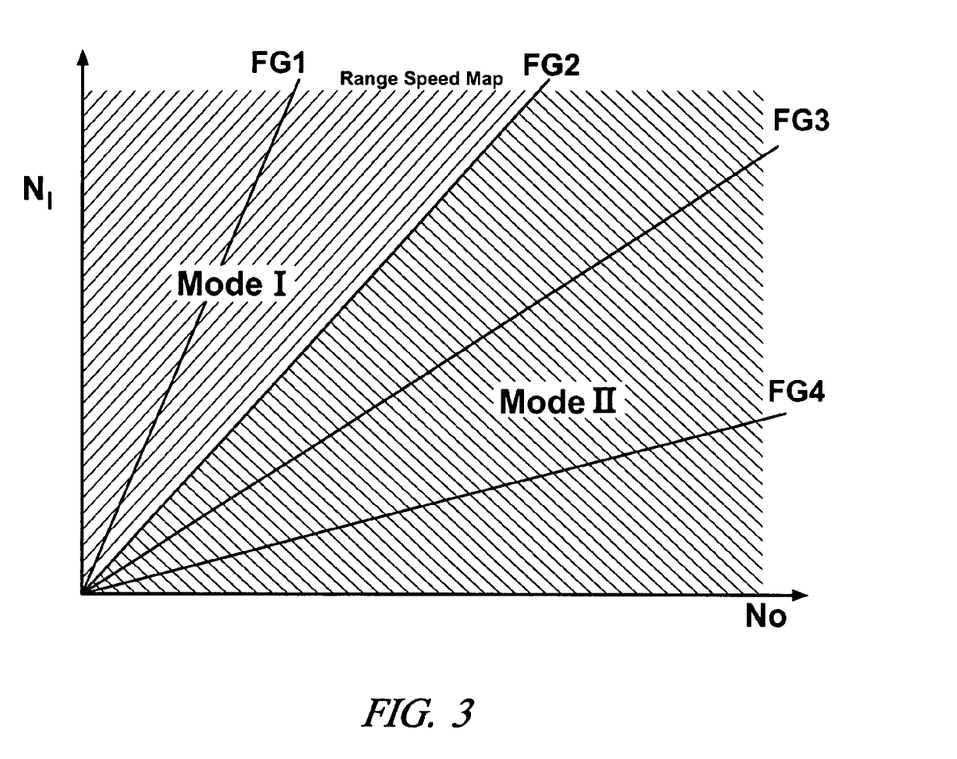
FIG. 3 is a graphical depiction, in accordance with an embodiment of the present invention.

Referring now to FIG. 3, the exemplary two-mode, compound-split, electro-mechanical transmission operates in one of several operating range states comprising fixed gear operation and continuously variable operation, described with reference to Table 1, below.

TABLE 1

| Transmission Operating Range State (Op_range) | Actuated Clutches | |
|---|---|---|
| Mode I—Engine Off (MI_Eng_Off) | C1 70 | |
| Mode I—Engine On (MI_Eng_On) | C1 70 | |
| Fixed Gear Ratio 1 (FG1) | C1 70 | C4 75 |
| Fixed Gear Ratio 2 (FG2) | C1 70 | C2 62 |
| Mode II—Engine Off (MII_Eng_Off) | C2 62 | |
| Mode II—Engine On (MII_Eng_On) | C2 62 | |
| Fixed Gear Ratio 3 (FG3) | C2 62 | C4 75 |
| Fixed Gear Ratio 4 (FG4) | C2 62 | C3 73 |

The various transmission operating range states described in the table indicate which of the specific clutches C1, C2, C3, and C4 are engaged or actuated for each of the operating range states. A first continuously variable operating range state, i.e., Mode I, is selected when clutch C1 70 is actuated in order to "ground" the outer gear member of the third planetary gear set 28. The engine 14 can be either on or off. A second continuously variable operating range state, i.e., Mode II, is selected when clutch C1 70 is released and clutch C2 62 is simultaneously actuated to connect the shaft 60 to the carrier of the third planetary gear set 28. Again, the engine 14 can be either on or off. For purposes of this description, Engine Off is defined by engine input speed, $N_E$, being equal to zero revolutions per minute (RPM), i.e., the engine crankshaft is not rotating, typically as a result of the engine being decoupled from the transmission. Other factors outside the scope of this disclosure affect when the electric machines 56, 72 operate as motors and generators, and are not discussed herein.

Mode I and Mode II are characterized by single clutch applications, i.e., either clutch C1 62 or C2 70, and by the controlled speed and torque of the electric machines 56 and 72, which can be referred to as a continuously variable transmission mode. Certain operating rage states are described below in which fixed gear ratios are achieved by applying an additional clutch. This additional clutch may be clutch C3 73 or C4 75, as shown in the table, above. When the additional clutch is applied, fixed gear operation of input-to-output speed of the transmission, i.e., $N_I/N_O$, is achieved. During fixed gear operation, the rotations of machines MG-A 56 and MG-B 72, i.e., $N_A$ and $N_B$, are dependent on internal rotation of the mechanism as defined by the clutching and proportional to the input speed measured at shaft 12.

In response to an operator's action, as captured by the UI 13, the supervisory HCP control module 5 and one or more of the other control modules determine the operator torque request to be executed at shaft 64. Final vehicle acceleration is affected by other factors, including, e.g., road load, road grade, and vehicle mass. The transmission operating range state is determined for the exemplary transmission based upon a variety of operating characteristics of the powertrain. This includes an operator demand for torque, typically communicated through inputs to the UI 13 as previously described. Additionally, a demand for output torque is predicated on external conditions, including, e.g., road grade, road surface conditions, or wind load. The transmission operating range state may be predicated on a powertrain torque demand caused by a control module command to operate one of the electric machines as an electrical generator or as an electric motor. The transmission operating range state can be determined by an optimization algorithm or routine operable to determine optimum system efficiency based upon operator demand for power, battery state of charge, and energy efficiencies of the engine 14 and MG-A 56 and MG-B 72. The control system manages torque inputs from the engine 14 and MG-A 56 and MG-B 72 based upon an outcome of the executed optimization routine, and system optimization occurs to optimize system efficiencies to improve fuel economy and manage battery charging. Furthermore, operation can be determined based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

The energy storage system and electric machines MG-A 56 and MG-B 72 are electrically-operatively coupled for power flow therebetween. Furthermore, the engine, the electric machines, and the electro-mechanical transmission are mechanically-operatively coupled to transmit power therebetween to generate a power flow to the output. In Mode I operation, the transmission operates as an input-split electrically variable transmission (EVT). In Mode II operation, the transmission operates as a compound-split EVT. While operating in either of these two modes, the control system performs closed loop control on an engine speed which optimizes fuel economy while still meeting the torque request and given power constraints. It then commands motor speeds to vary the input-to-output speed ratio to accelerate the vehicle, in response to the operator torque request. Through use of the two additional clutches, the transmission also has the capability of achieving one of four fixed gear ratios. While operating in a fixed gear, the vehicle acts as a parallel hybrid and the motors are used only for boosting and braking/regeneration the vehicle.

Figure 4:
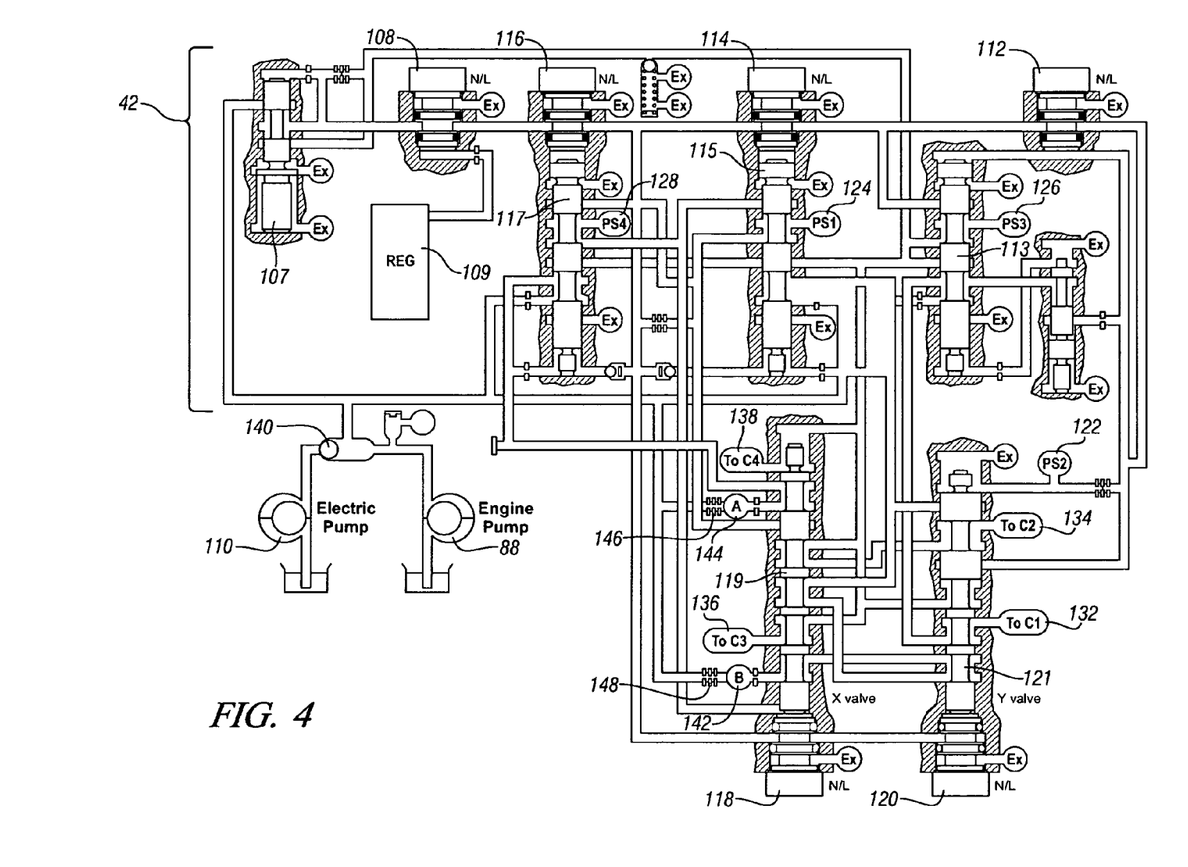
FIG. 4 is a schematic diagram of a hydraulic circuit, in accordance with an embodiment of the present invention; and, FIG. 5 is an algorithmic flowchart, in accordance with an embodiment of the present invention.

Referring to FIG. 4, a schematic diagram is depicted which provides a more detailed description of the exemplary electro-hydraulic system for controlling flow of hydraulic fluid in the exemplary transmission. The main hydraulic pump 88, driven off the input shaft 12 from the engine 14, and auxiliary pump 110, operatively electrically controlled by the TPIM 19, provides pressurized fluid to the hydraulic circuit 42 through valve 140. The auxiliary pump 110 preferably comprises an electrically-powered pump of an appropriate size and capacity to provide sufficient flow of pressurized hydraulic fluid into the hydraulic system when operational. Pressurized hydraulic fluid flows into electro-hydraulic control circuit 42, which is operable to selectively distribute hydraulic pressure to a series of devices, including the torque-transfer clutches C1 70, C2 62, C3 73, and C4 75, active cooling circuits for machines A and B, and a base cooling circuit for cooling and lubricating the transmission 10 via passages 142, 144 (not depicted in detail). As previously stated, the TCM 17 is preferably operable to actuate the various clutches to achieve various transmission operation through selective actuation of hydraulic circuit flow control devices comprising variable pressure control solenoids (PCS) PCS1 108, PCS2 112, PCS3 114, PCS4 116 and solenoid-controlled flow management valves X-valve 119 and Y-valve 121. The circuit is fluidly connected to pressure switches PS1, PS2, PS3, and PS4 via passages 124, 122, 126, and 128, respectively. There is an inlet spool valve 107. The pressure control solenoid PCS1 108 has a control position of normally high and is operative to modulate fluidic pressure in the hydraulic circuit through fluidic interaction with controllable pressure regulator 109. Controllable pressure regulator 109, not shown in detail, interacts with PCS1 108 to control hydraulic pressure in the hydraulic circuit 42 over a range of pressures, depending upon operating conditions as described hereinafter. Pressure control solenoid PCS2 112 has a control position of normally low, and is fluidly connected to spool valve 113 and operative to effect flow therethrough when actuated. Spool valve 113 is fluidly connected to pressure switch PS3 via passage 126. Pressure control solenoid PCS3 114 has a control position of normally low, and is fluidly connected to spool valve 115 and operative to effect flow therethrough when actuated. Spool valve 115 is fluidly connected to pressure switch PS1 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High (1) and Low (0). The control states refer to positions of each valve with which to control flow to different devices in the hydraulic circuit 42 and the transmission 10. The X-valve 119 is operative to direct pressurized fluid to clutches C3 and C4 and cooling systems for stators of MG-A 56 and MG-B 72 via fluidic passages 136, 138, 144, 142 respectively, depending upon the source of the fluidic input, as is described hereinafter. The Y-valve 121 is operative to direct pressurized fluid to clutches C1 and C2 via fluidic passages 132 and 134 respectively, depending upon the source of the fluidic input, as is described hereinafter. The Y-valve 121 is fluidly connected to pressure switch PS2 via passage 122. A more detailed description of the exemplary electro-hydraulic control circuit 42 is provided in commonly assigned U.S. patent application Ser. No. 11/263,216, which is incorporated herein by reference.

An exemplary logic table to accomplish control of the exemplary electro-hydraulic control circuit 42 is provided with reference to Table 2, below.

TABLE 2

| Operating State | X-Valve Logic No Latch | Y-Valve Logic C2 Latch | PCS1 Normal High | PCS2 Normal High | PCS3 Normal High | PCS4 NormalLow |
|---|---|---|---|---|---|---|
| Mode I (MI) | 0 | 0 | Line Modulation | MG-B Stator Cool | C1 | MG-A Stator Cool |
| Mode II (MII) | 0 | 1 | Line Modulation | C2 | MG-B Stator Cool | MG-A Stator Cool |
| Low Range FG1, FG2 MI, MII | 1 | 0 | Line Modulation | C2 | C1 | C4 |
| High Range FG3, FG4 MI, MII | 1 | 1 | Line Modulation | C2 | C3 | C4 |

Selective control of the X and Y valves and actuation of the solenoids PCS2, PCS3, and PCS4 facilitate flow of hydraulic fluid to actuate clutches C1, C2, C3, and C4, and provide cooling for the stators of MG-A 56 and MG-B 72.

In operation, one of the fixed gear and continuously variable operating range states is determined for the exemplary transmission based upon a variety of operating characteristics of the powertrain. This includes an operator torque request, typically communicated through inputs to the UI 13 as previously described. Additionally, a demand for output torque is predicated on external conditions, including, e.g., road grade, road surface conditions, or wind load. Transmission operating range state may be predicated on a powertrain torque demand caused by a control module command to operate of the electric machines as an electrical generator or as an electrical motor. Operation can be determined by an optimization algorithm or routine operable to determine optimum system efficiency based upon operator demand for power, battery state of charge, and energy efficiencies of the engine 14 and MG-A 56 and MG-B 72. The control system manages torque inputs from the engine 14 and MG-A 56 and MG-B 72 based upon an outcome of the executed optimization routine, and system optimization occurs to optimize system efficiencies to improve fuel economy and manage battery charging. Furthermore, operation can be determined based upon a fault in a component or system.

Referring now to the transmission described with reference to FIGS. 1, 2, 3, and 4, and Tables 1 and 2, specific aspects of the transmission and control system are described herein. The control system is operative to selectively actuate the pressure control devices and the flow management valves based upon a demand for torque, presence of a fault, and temperatures of the electric motors. The control system selectively commands one of a low-range continuously variable operation, a high-range continuously variable operation, a low range state, and a high range state based upon selective actuation of the X-valve 118 and Y-valve 120 flow management valves. The control system effects actuation of the stator cooling system for the first electric machine (MG-A Stator Cool), the stator cooling system for the second electric machine (MG-B Stator Cool), and the first hydraulically-actuated clutch (C1) based upon selective actuation of the pressure control devices PCS2, PCS3, and PCS4 when the low-range continuously variable operation has been commanded. Furthermore, the control system is operative to effect actuation of the stator cooling system for MG-A 56, stator cooling system for MG-B 72, and the second hydraulically-actuated clutch C2 based upon selective actuation of the pressure control devices when a high-range continuously variable operation has been commanded. The control system is operative to effect actuation of the first, second, and fourth hydraulically-actuated clutches (i.e., C1, C2, C4) based upon selective actuation of the pressure control devices when a low-range state has been commanded, comprising operation in one of FG1, FG2, MI and MII via selective actuation of the clutches. The control system is operative to effect actuation of the second, third, and fourth hydraulically-actuated clutches (i.e., C2, C3, C4) based upon selective actuation of the pressure control devices when a high-range state has been commanded, comprising operation in one of FG2, FG3, FG4, and MI and MII via selective actuation of the clutches.

As previously stated, fluid output from each of the second, third and fourth pressure control devices (i.e., PCS2, PCS3, and PCS4) is selectively mapped to one of the four hydraulically-actuated clutches and stator cooling systems for MG-A 56 and MG-B 72 based upon commanded positions of the first and second flow management valves. Therefore, selective actuation of PCS2 effects flow of hydraulic fluid to provide cooling to the stator of MG-B 72, when both the X-valve and the Y-valve are commanded to Low. Selective actuation of PCS2 effects flow of hydraulic fluid to actuate clutch C2 when either of the X-valve and the Y-valve are commanded to High. Selective actuation of PCS3 effects flow of hydraulic fluid to actuate clutch C1 when both the X-valve and the Y-valve are commanded to Low. Selective actuation of PCS3 effects flow of hydraulic fluid to provide cooling to the stator of MG-B 72 when the X-valve is commanded to Low and the Y-valve is commanded to High. Selective actuation of PCS3 effects flow of hydraulic fluid to actuate clutch C1 when the X-valve is commanded to High and the Y-valve is commanded to Low. Selective actuation of PCS3 effects flow of hydraulic fluid to actuate clutch C3 when both the X-valve and the Y-valve are commanded to High. Selective actuation of PCS4 effects flow of hydraulic fluid to provide cooling to the stator of MG-A 56 when the X-valve is commanded to Low, regardless of the position to which the Y-valve is commanded. Selective actuation of PCS4 effects flow of hydraulic fluid to actuate clutch C4 when the X-valve is commanded to High, regardless of the position to which the Y-valve is commanded.

When the control system commands operation in one of the continuously variable operating range states, i.e., Mode I or Mode II, the control system utilizes a closed-loop system to control engine operation, with engine speed controlled to an optimum speed, Ni_opt. The optimum speed is determined based upon factors related to torque output, fuel economy, operator torque request, and, battery state of charge. When operating with closed-loop control around engine speed, the control system monitors engine input speed, Ni, and transmission output at shaft 64, and adjusts output torques for MG-A 56 and MG-B 72 to meet the operator torque request.

A potential powertrain system fault includes a mismatch between a commanded operating range state and an actual operating state of the transmission. This includes the control system commanding operation in one of the continuously variable operating range states, whereas the transmission actually operates in one of the fixed gear operating range states. This is referred to as a mode-gear mismatch. During ongoing operation, the control system commands either of continuously variable operating range states, Mode I and Mode II, as depicted in Table 2.

In operation, the electro-mechanical transmission is commanded by one of the control modules to operate in one of the continuously variable operating range states, i.e., either Mode I or II, through selective actuation of either clutch C1 or clutch C2. Operation of the transmission is monitored, including the rotational speeds of various elements, including $N_I$, $N_O$, $N_A$, and $N_B$. An absence of a mismatch between the commanded operating range state and an actual operating state of the transmission is determined based upon the monitored operation of the transmission. Presence of a mismatch between the commanded operating range state and the actual operating state of the transmission is detected based upon the monitored operation of the transmission. The commanded operation of the internal combustion engine is modified when a mismatch between the commanded operating range state and an actual operating state of the transmission is detected. This is now described in detail.

A first tactic for detecting a mode-gear mismatch includes affirmatively determining an absence of the mode-gear mismatch by monitoring clutch slippage. This detection tactic comprises monitoring and detecting clutch slippage during steady state operation in one of Mode I and II, wherein only a single clutch is applied, i.e., commanded actuated. During operation, only a single clutch, i.e., either C1 or C2, is expected to demonstrate clutch slippage at or near-zero during any given period of time. When there is a significant amount of slip across a clutch for a length of time it can be determined that the specific clutch is not actuated, and there is no mode/gear mismatch. Thus, in Mode I, Clutch C1 is commanded actuated, with slippage occurring across each of clutches C2, C3, and C4. Thus, in Mode II, Clutch C2 is commanded actuated, with slippage occurring across each of clutches C1, C3, and C4. When such slippage conditions are determined for the clutches whose actuation is not commanded, the control strategy affirms the absence of a mode-gear mismatch. However, if a condition occurs wherein it is determined that one of the unactuated clutches has slippage at or near zero slip speed, then there is a potential that that clutch is actuated, and a resulting mode-gear mismatch. Slippage across each of the clutches is determined based upon the various rotational speeds of Ni, No, Na, and Nb.

A second tactic for detecting a mode-gear mismatch includes affirmatively determining an absence of the mode-gear mismatch by monitoring engine input speed. During operation in Mode I or Mode II, the control system controls input speed, Ni, to a calculated optimum engine speed, Ni_opt. In closed loop control around the optimum input speed, Ni_opt, the input speed is expected to follow the optimum speed profile. In the event of a mode-gear mismatch, it is likely that there is a significant difference between the current engine speed, Ni, and the optimum input speed, Ni_opt, which is measurable and detectable. Therefore, when the input speed, Ni, follows the optimum input speed, Ni_opt, the control strategy affirms the absence of a mode-gear mismatch.

When the outcomes of the first and second tactics are unable to verify the absence of a mode-gear mismatch, additional tactics are executed to detect the presence of a mode-gear mismatch. For example, during steady state operation a mode-gear mismatch may occur which is unperceivable to the vehicle operator, or results in a light acceleration event.

A third tactic for detecting a mode-gear mismatch includes affirmatively detecting presence of the mode-gear mismatch by monitoring motor torque from both of the electric machines. During operation in either Mode I or Mode II, the control system calculates the motor torque needed from both the electric machines to achieve the optimum closed loop engine speed control, Ni_opt.

A fourth tactic for detecting a mode-gear mismatch includes affirmatively detecting presence of the mode-gear mismatch by monitoring slippage of the clutches to detect zero-slip conditions. During mode operation, a clutch which is not actuated should have some slippage. By monitoring clutch slippage, a zero-slip condition can be determined. When the output speed is not decelerating, then slip speed of an oncoming clutch will eventually reach near-zero speed (steady state), even during a mode-gear mismatch. Therefore, when there is no clutch slippage in an unapplied clutch, the control strategy detects a mode-gear mismatch.

Figure 5:
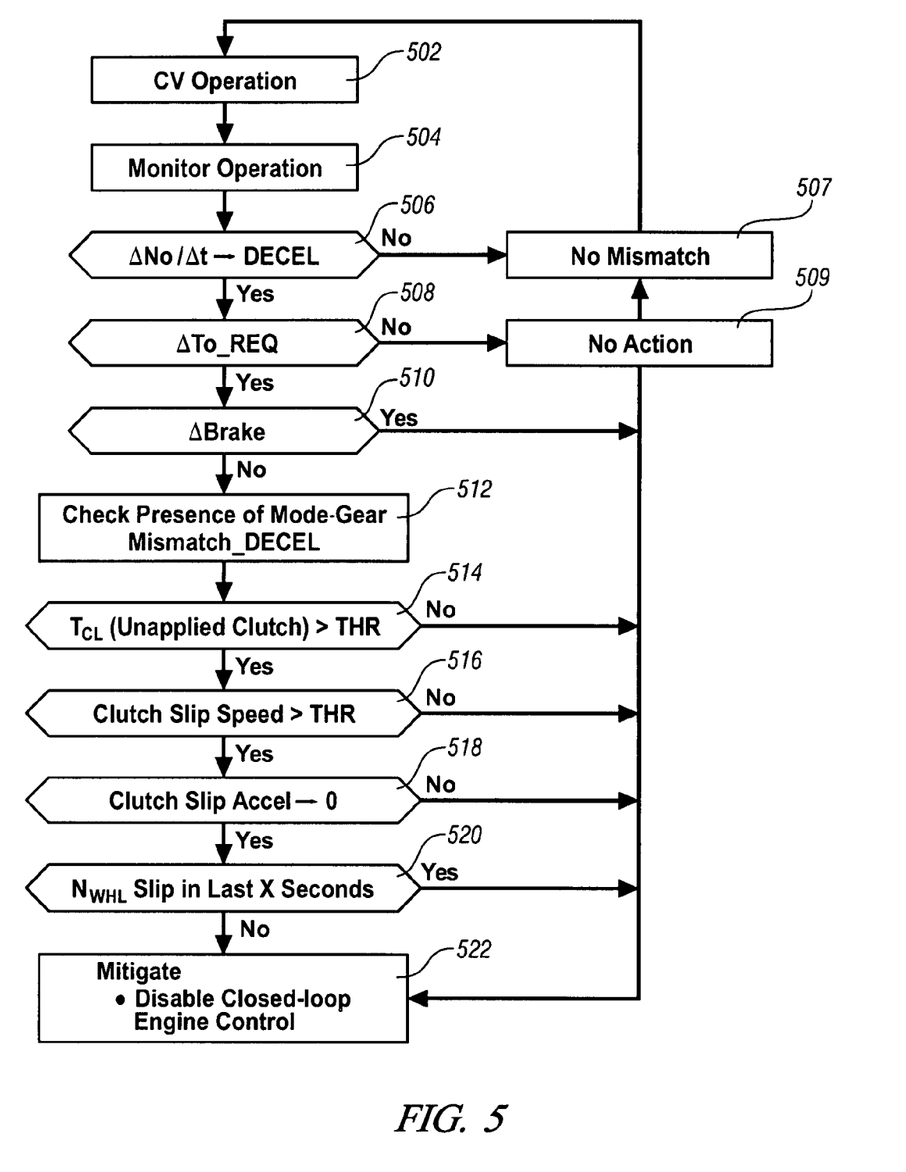

Referring now to the flowchart depicted in FIG. 5, with reference to the exemplary transmission described with reference to FIGS. 1, 2, 3, and Tables 1 and 2, specific aspects of controlling operation of the exemplary transmission and control system are described to detect a mode/gear mismatch, and more specifically detecting a mode/gear mismatch resulting in vehicle deceleration. The flowchart is reduced to program code periodically executed in one of the control modules. Presence of a mismatch between the commanded operating range state and the actual operating state of the transmission is detected based upon the monitored operation of the transmission. The commanded operation of the powertrain is modified when a mismatch between the commanded operating range state and an actual operating state of the transmission is detected; in this embodiment operation of the internal combustion engine is modified. This is now described in detail.

In this operation, the electro-mechanical transmission is commanded to operate in one of the continuously variable (CV) operating modes, i.e., Mode I or Mode II, and the engine is operated in a closed-loop speed control mode (502). Operation is monitored, including the sensors adapted to monitor input speeds and torques of MG-A 56 and MG-B 72, output shaft speed, $N_O$, using transmission output speed sensor 84, and wheel speeds. Operator torque request through the accelerator pedal ($T_{O\_REQ}$) and brake request (BRAKE) are monitored (504). A time-rate change in the output shaft speed, $N_O$, is monitored and evaluated. The output shaft speed, $N_O$, directly translates to wheel speed through the driveline 90. A rapid change, either an increase or a decrease, in the wheel speed is perceptible to the vehicle operator, in the form of g-force. In the system described herein, the intent is to detect and mitigate an unintended g-force that exceeds a threshold of 0.3 g, or about 3 meters per second squared (m/s$^2$) within 200 milliseconds of its occurrence. Thus, an acceleration threshold is determined which translates the threshold g-force into a change in rotational speed of the output shaft.

The monitored change in speed ($\Delta N_O/\Delta t$) is compared to an acceleration threshold to determine whether a deceleration is occurring (506). The comparison is preferably on an absolute value basis, to accommodate both acceleration and decelerations. When a deceleration is not detected, there is no mode-gear mismatch, and no action taken (507). When the change in speed exceeds the threshold, the control module verifies that there are no outside factors or commands driving or forcing the change in speed. Thus, it is determined whether the operator input to the accelerator pedal has changed (508), and whether the operator input to the brake pedal has increased, indicating a brake request (510). If there are changes in one or both, then no action is taken (509). Under a condition wherein there is a change in output speed, and no change in the operator inputs to the powertrain, then the operation continues to determine whether a mode-gear mismatch is present (512).

A mode-gear mismatch which results in deceleration will have several characteristics, including excess torque across an unapplied clutch can be observed. For Mode I and Mode II operation the control system calculates the motor torque needed from both motors to achieve the closed loop engine speed control. From this calculation and the current motor torques the 'excess torque' of each motor and each clutch is calculated. If there is a significant amount of excess torque on a clutch which should not be applied then a mode-gear mistake may be occurring (514). When there is no excess torque, a deceleration mode-gear mismatch is not occurring.

During a deceleration event due to a mode-gear mismatch the oncoming clutch is not initially fully applied, due to system lag. Therefore, unlike the steady state detection, the clutch slip speed does not indicate a near-zero slip speed. However, a clutch slip speed which is approaching zero at a rapid rate is indicated. Therefore the deceleration detection requires the magnitude of the clutch slip speed be above a certain threshold and the slip acceleration must show a trend towards zero. When these two criteria are true, a Mode-Gear mismatch in deceleration may be occurring, and conversely, when these are not true then the deceleration mode-gear mismatch is not occurring (516, 518). A potential false failure can be avoided by determining if the vehicle has recently slipped its wheels, e.g., within a predetermined period of time, typically measured in seconds. When a vehicle is slipping its tires (e.g., accelerating out of snow and moving onto dry pavement) the TOSS sensor shows a rapid decrease of output speed and therefore detects a deceleration. Inputs from wheel speed sensors 94 are observed to determine whether the vehicle has spun its tires in the past X seconds, i.e., identifying presence of $N_{WHL}$ slip. Under such conditions, the ensuing deceleration is not determined to be a mode-gear mismatch in deceleration (520).

When a mode-gear mismatch is experienced and detected as indicated by the time-rate change in the transmission output exceeding a threshold absent a change in the monitored operator inputs, operation of the powertrain is preferably modified in a timely manner (522). The immediate action in this embodiment is that the control system terminates operating the engine in the closed-loop speed control mode, to reduce torque input to the electro-mechanical transmission from the engine. This includes sending a software control flag to the control system to disable the closed loop engine control, and subsequently informing the operator by illuminating a dashboard lamp. A subsequently detected affirmative pass, i.e., outcome of executing the first or second tactics, results in a pass condition for a calibratable length of time, the closed loop engine control is preferably re-enabled. Alternatively, other engine operating modes may be terminated to immediately reduce engine input torque to the transmission, including retarding spark advance, reduced engine fueling, and adjusting opening and closing of engine valves using variable valve control techniques related to timing, duration, and lift of intake and/or exhaust engine valves.

There are preferably different conditions for affirmatively determining an absence of the mode-gear mismatch, and affirmatively determining a presence of a mode-gear mismatch. Therefore, there can be a condition wherein a vehicle may both determine an absence and determine a presence of a mode-gear mismatch at the same time. This may occur during a short time window when the vehicle is experiencing a sharp deceleration due to an oncoming clutch which still has a slip speed above the threshold of the pass criteria. For this reason the action of disabling the closed loop speed control continues until the pass condition has been met a calibratable amount of time, typically less than four seconds. If the clutch continues to be applied, the clutch slip speed drops below the pass condition threshold within the calibratable amount of time and engine closed loop remains disabled. If the clutch is no longer applied, and the test continues to pass, engine closed loop control is re-enabled.

The invention has been described with specific reference to the disclosed embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for operating a powertrain including an electro-mechanical transmission mechanically-operatively coupled to an internal combustion engine at a transmission input and a plurality of electric machines for mechanical power flow to a transmission output through selective actuation of a plurality of torque-transfer devices, said electric machines electrically-operatively coupled to an energy storage system for electric power flow therebetween, said electro-mechanical transmission selectively operative in one of a plurality of continuously variable and fixed gear operating range states, the method comprising:
   commanding operation of the electro-mechanical transmission in one of the continuously variable operating range states;
   commanding operation of the engine in a closed-loop speed control mode which always includes operation of the engine;
   monitoring rotational speed of the transmission input, each of the plurality of electric machines, and the transmission output, and;
   monitoring operator inputs comprising an operator torque request and an operator braking request;
   during operation of the engine in the closed-loop speed control mode, detecting presence of a potential mismatch between the commanded operating range state comprising said one of the continuously variable operating range states and an actual operating range state comprising one of the fixed gear operating range states based upon a determined deceleration in the transmission output due to the presence of the potential mismatch; and,
   modifying operation of the powertrain when a change in the rotational speed of the transmission output exceeds a threshold absent a corresponding change in the monitored operator inputs.

2. Method for operating a powertrain including an electro-mechanical transmission mechanically-operatively coupled to an internal combustion engine at a transmission input and a plurality of electric machines for mechanical power flow to a transmission output through selective actuation of a plurality of torque-transfer devices, said electric machines electrically-operatively coupled to an energy storage system for electric power flow therebetween, said electro-mechanical transmission selectively operative in one of a plurality of continuously variable and fixed gear operating range states, the method comprising:
   commanding operation of the electro-mechanical transmission in one of the continuously variable operating range states;
   commanding operation of the engine in a closed-loop speed control mode;
   monitoring rotational speed of the transmission input, each of the plurality of electric machines, and the transmission output, and;
   monitoring operator inputs comprising an operator torque request and an operator braking request;
   detecting presence of a potential mismatch between the commanded operating range state and an actual operating range state based upon the transmission output, comprising:
      calculating a time-rate change in the rotational speed of the transmission output;
      determining the time-rate change in the rotational speed of the transmission output exceeds a threshold; and
   modifying operation of the powertrain when a change in the rotational speed of the transmission output exceeds the threshold absent a corresponding change in the monitored operator inputs.

3. The method of claim 2, wherein the threshold corresponds to a vehicular acceleration rate of about three meters per second per second.

4. The method of claim 3, wherein the time-rate change in the rotational speed of the transmission output and the threshold comprise absolute values.

5. The method of claim 2, wherein modifying operation of the powertrain further comprises terminating operating the engine in the closed-loop speed control mode when the time-rate change in the rotational speed of the transmission output exceeds the threshold absent a change in the operator brake input.

6. Method for operating a powertrain including an electro-mechanical transmission mechanically-operatively coupled to an internal combustion engine at a transmission input and a plurality of electric machines for mechanical power flow to a transmission output through selective actuation of a plurality of torque-transfer devices, said electric machines electrically-operatively coupled to an energy storage system for electric power flow therebetween, said electro-mechanical transmission selectively operative in one of a plurality of continuously variable and fixed gear operating range states, the method comprising:
   commanding operation of the electro-mechanical transmission in one of the continuously variable operating range states comprising selectively actuating a single one of the torque-transfer devices;
   commanding operation of the engine in a closed-loop speed control mode;
   monitoring rotational speed of the transmission input, each of the plurality of electric machines, and the transmission output, and;
   monitoring operator inputs comprising an operator torque request and an operator braking request;
   detecting presence of a potential mismatch between the commanded operating range state and an actual operating range state based upon the transmission output; and
   modifying operation of the powertrain when a change in the rotational speed of the transmission output exceeds a threshold absent a corresponding change in the monitored operator inputs.

7. The method of claim 1, further comprising determining absence of a mismatch between the commanded operating range state and the actual operating state of the transmission.

8. The method of claim 7, further comprising
   determining slippage across each of the torque-transfer devices based upon the monitored rotational speeds of the transmission input, the transmission output, and, the electric machines; and,
   determining clutch slippage is not zero for each of the torque-transfer devices not selectively actuated.

* * * * *